United States Patent
Reymond et al.

(10) Patent No.: US 6,315,110 B1
(45) Date of Patent: Nov. 13, 2001

(54) RETRACTABLE CENTRAL CONVEYOR IN A FOLDER-GLUER

(75) Inventors: Jacques Reymond, Gland; Roberto Valterio, Ollon, both of (CH)

(73) Assignee: Bobst SA (CH)

( * ) Notice: Subject to any disclaimer, the term of this patent is extended or adjusted under 35 U.S.C. 154(b) by 0 days.

(21) Appl. No.: 09/395,678

(22) Filed: Sep. 13, 1999

(30) Foreign Application Priority Data

Sep. 16, 1998 (CH) .................................................. 1882/98

(51) Int. Cl.$^7$ .................................................. B65G 15/00
(52) U.S. Cl. ...................... 198/809; 198/817; 493/179; 493/182
(58) Field of Search .................. 198/817, 809; 493/177–183

(56) References Cited

U.S. PATENT DOCUMENTS

| | | | |
|---|---|---|---|
| 1,096,633 | * 5/1914 | Labombarde | 493/179 |
| 1,104,018 | * 7/1914 | Staude | 493/179 |
| 3,797,370 | * 3/1974 | Sawada | 493/179 |
| 5,151,075 | 9/1992 | Beaulleu | 493/179 |
| 5,165,516 | * 11/1992 | Reed et al. | 198/809 |
| 5,542,809 | * 8/1996 | Kita et al. | 198/809 |
| 5,797,831 | * 8/1998 | Roberts et al. | 493/179 |
| 5,853,360 | * 12/1998 | Jeffrey et al. | 493/179 |

FOREIGN PATENT DOCUMENTS 2335341   7/1977 (FR) .

6000898   1/1994 (JP) .......................................... 1/58

* cited by examiner

Primary Examiner—Christopher P. Ellis
Assistant Examiner—Mark A. Deuble
(74) Attorney, Agent, or Firm—Ostrolenk, Faber, Gerb & Soffen, LL

(57) ABSTRACT

This retractable central conveyor (1) being used in a folder-gluer converting plate-like workpieces such as paper or cardboard for producing packagings. Such a folder-gluer comprises two frames between which are arranged two lateral conveyors (100, 110), the conveying means of which being belts (101, 111). The conveyor of the present invention comprises a structure consisting of four associated components (4, 5, 8, 11) which are transversely movable between the frames of the folder-gluer with respect to the travelling direction of said plate-like workpieces. Among these components of this structure, an upper longitudinal bar (4) can easily be manually lowered, in a vertical slanted movement, from a working position to a retracted position, and inversely raised by independent damping means (15). The central conveyor (1) can be retracted between the two lateral conveyors (100, 110) thus enabling the folder-gluer to be used in a new configuration where uncoupling of the transmission means necessary for the independent drive of the belt (30) is not required and which belt (30) is rotatable even in the retracted position. This conveyor allows to arrange the two lateral conveyors (100, 110) side by side so that the useable conveying width of the folder-gluer is reduced to a minimum value.

20 Claims, 7 Drawing Sheets

Figure 1A:
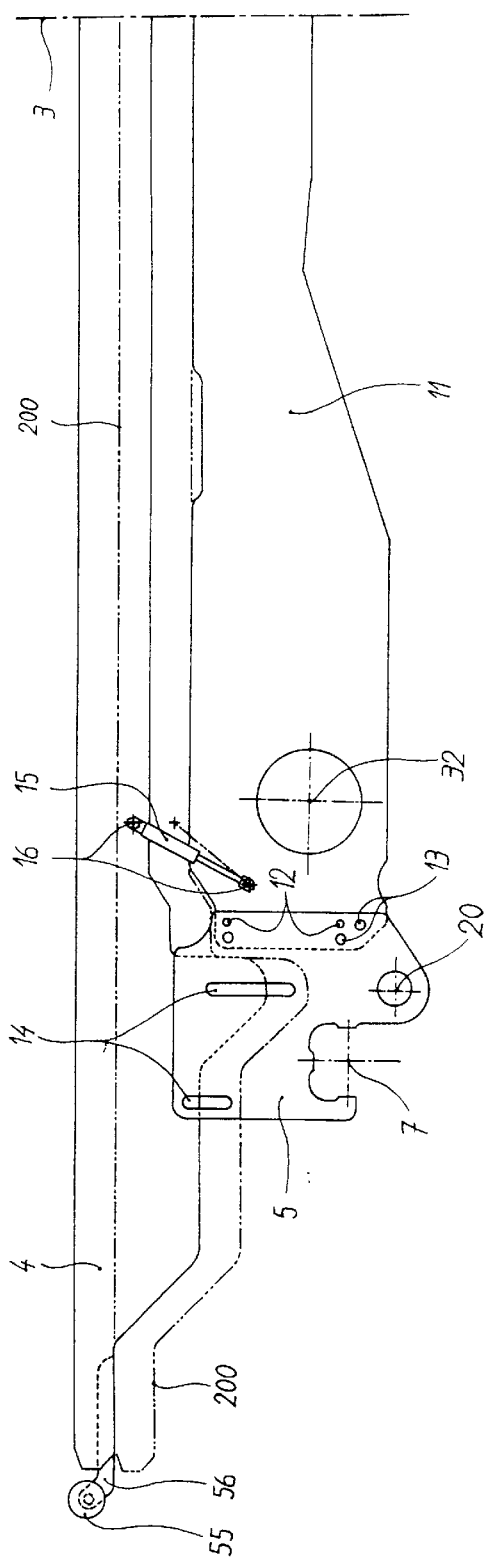

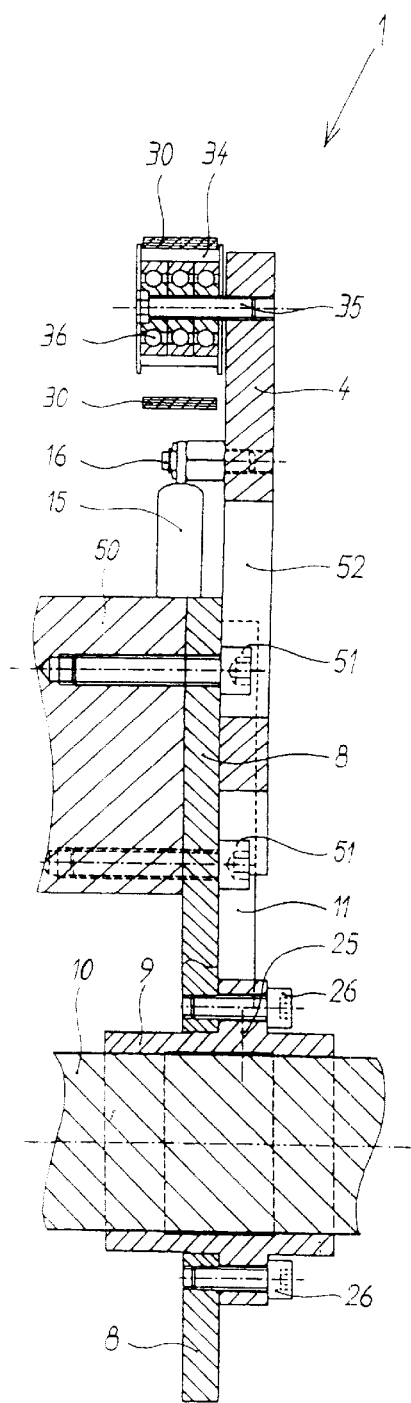
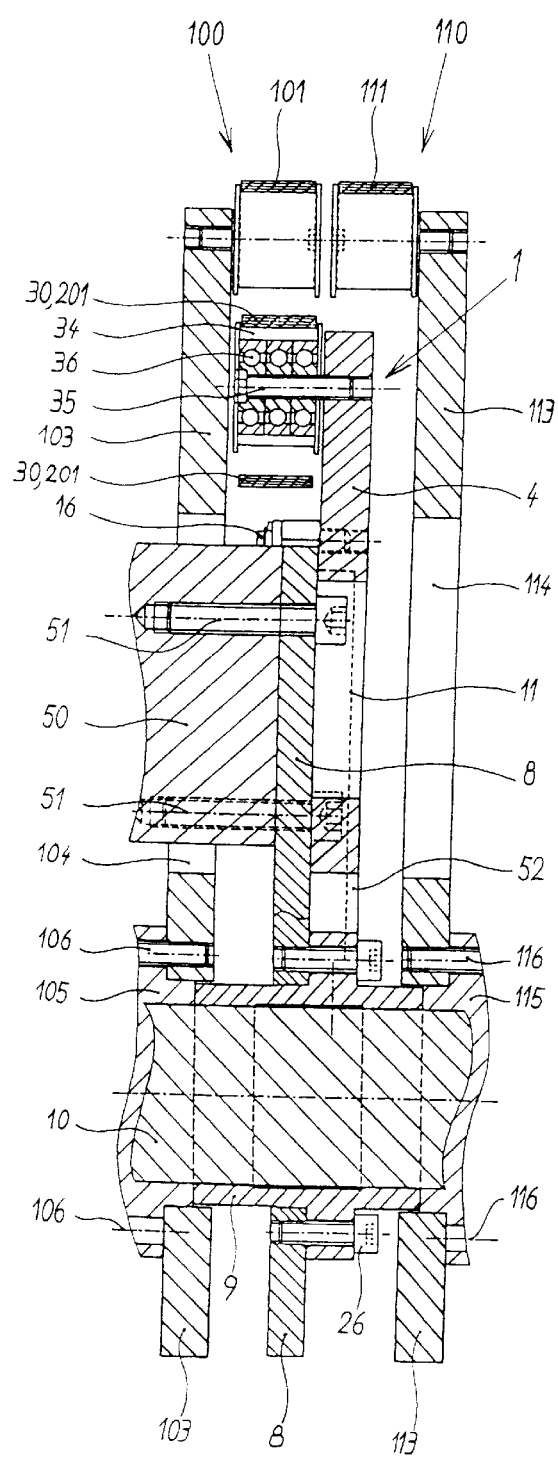
Fig. 4a
Fig. 4b

RETRACTABLE CENTRAL CONVEYOR IN A FOLDER-GLUER

The present invention refers to a retractable central conveyor in a folder-gluer, which is a machine, that is commonly used in the packaging industry, for example, for manufacturing carton boxes from cut plate-like workpieces.

Such machines, which comprise a succession of modules, the number of which depend on the complexity of the manufacturing operations required by the type of box chosen, generally consist of at least a feeder feeding the box production blank by blank from a pile, a breaker prebreaking the first and third creases between 90° and 180° then reopening the blank, a module of folders with hooks, which fold the front flaps then the rear flaps of the blank to 180°, a gluing station, a folder for folding the second and fourth creases of the blank, a pressing device, which compresses the second and fourth creases and arranges the boxes in a shingle stream and, finally, a delivery module, which receives the boxes while keeping them pressed to allow the glue to dry. The blanks are conveyed from station to station by means of belt conveyors, which frictionally seize the blank either between lower and upper belts or between lower belts and upper support rollers.

The retractable conveyor is used in the folder, which folds the second and fourth creases of the blank. Such a station generally consists of belt conveyors, which are longitudinally arranged in the travelling direction of the workpieces, and of a plurality of folding means such as belts, helical guides, blades and folding ramps. All these means are advantageously mounted in a line, generally on three longitudinal bars, which are transversely movable according to the size of the blanks to be processed. In the folder, during converting, the blanks are primarily conveyed by a lower and upper central belt conveyor and by two pairs of lower and upper lateral belt conveyors. The folding achieves progressively following the twisted geometry of a lateral folding belt, the twist of which being ensured by a helical folding guide.

When the job size should be changed while using the same equipment, the longitudinal bars supporting the conveyor belts and the folding means can easily be moved transversely between the frames of the folder-gluer. However, the maximum useable width of such a machine is roughly given by the distance separating its two frames, and the minimum useable width is defined by the value of the widths of the three belts of the lateral conveyors and the central conveyor. If with this same folder-gluer a job is to be performed with blanks of sizes, which are smaller than this minimum width, it is necessary to save the space taken by the central conveyor or conveyors by removing them from the folder-gluer. The removal of the upper central conveyor does not present any particular problem, since it can easily be raised above the production line in a rest position, but the lower central conveyor has to be completely dismantled. To this end, it is necessary to slacken and remove the driving belt of the central conveyor, to detach the transmission shaft and to completely extract the central longitudinal bar held between the frames of the machine. This is a long and tedious task, due to the space requirement, the mass of some objects and the lack of access to this central part of the folder-gluer, without any alternative known at present.

To meet these difficulties, the present invention proposes a retractable lower central conveyor, which can easily be housed in the gaps left by the two lateral conveyors placed side by side without interferring with the operating mode of them. Of course, the lower central conveyor is only retracted when the corresponding upper conveyor is itself in a retracted position above the production line. Thus, it will be possible for a folder-gluer, which generally works with large and medium sizes, by this retraction and in a very short time, to develop its useable width up to a minimum dimension approaching the dimension of only two belts placed side by side.

To this aim, the present invention refers to a retractable central conveyor according to claim 1.

The following advantages result from the present invention a machine set-up time being considerably shortened by a semiautomatic retraction of said conveyor and by the simplicity of and the little operations required for putting it into operation or out of action, the fact that there is no heavy and bulky material to be mounted or dismantled, thus avoiding any undesired handling involving, for example, the need of any lifting means for removing the central conveyor, a very short adjusting time since it is not necessary to slacken and retighten or even replace the lower belt at each retraction of the central conveyor, the fact that there is no need for the objects such as the transmission shaft or the sliding axes of the longitudinal bars to be removed from the frame of the folder-gluer, and, consequently, the reduction of the selfcost price of any packaging production requiring such an adaption of the folding module.

In order to define a few terms introduced into the present description and describing the position of certain components in the folder-gluer, we shall use the expressions "operator's side" (C.C.) and "opposite operator's side" (C.O.C.), these terms being used by general agreement to denote a particular side relative to the longitudinal central axis of the machine. This choice avoids any confusion regarding the usual terms "left" and "right", which depend on the observer's point of view. Similarly, the orientation of some movements or objects will be described by the usual terms "longitudinal" and "transversal", always with reference to the central axis of the machine, the orientation of which depends on the direction of travel of the plate-like workpieces. Finally, note that the terms "upstream" and "downstream" refer to the direction of motion of the plate-like workpieces in the folder-gluer.

Figure 1B:
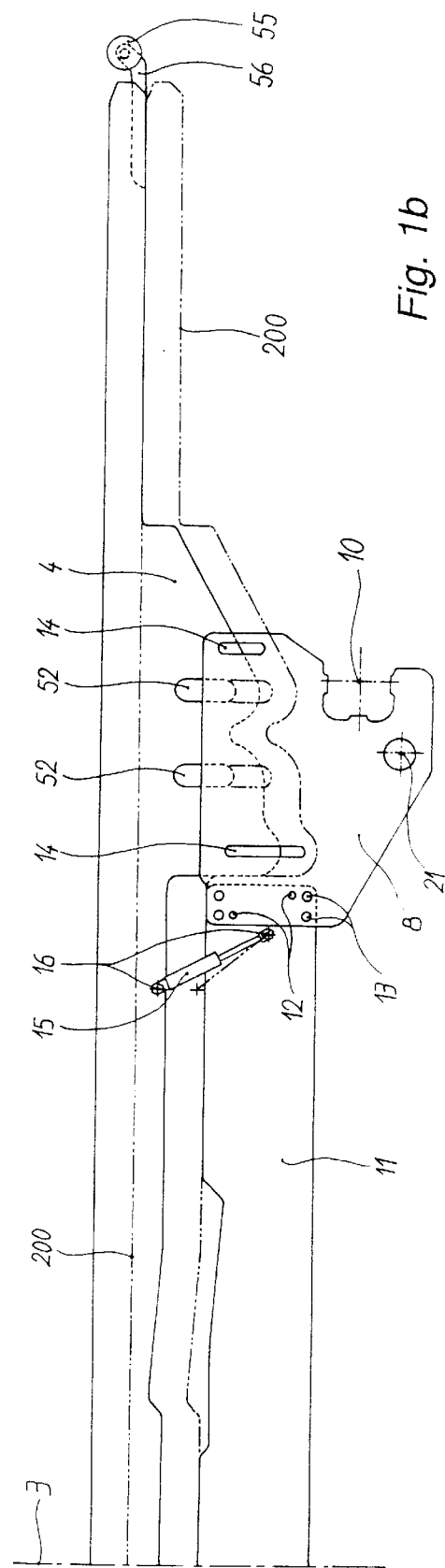
Figure 2A:
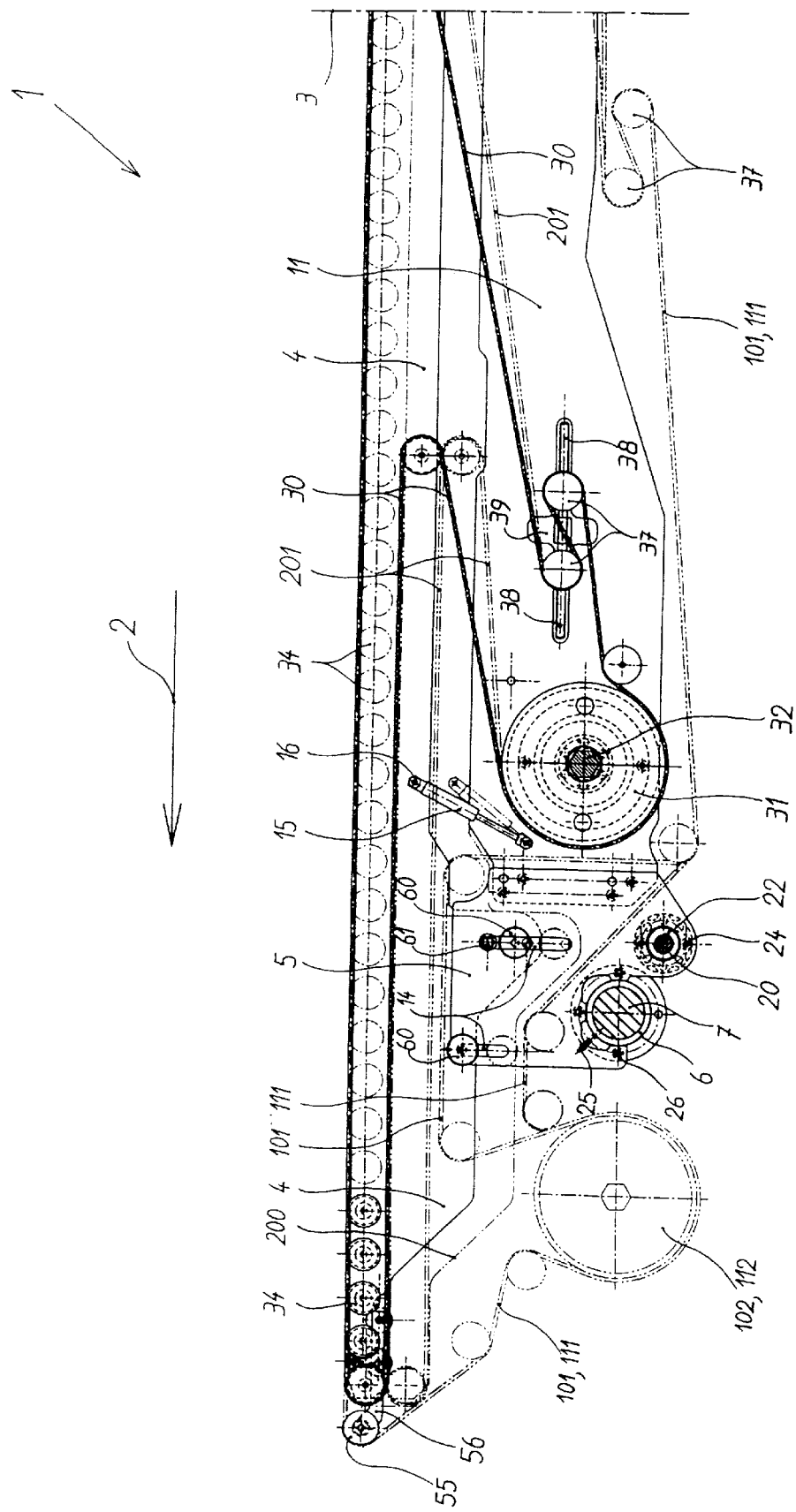
Figure 2B:
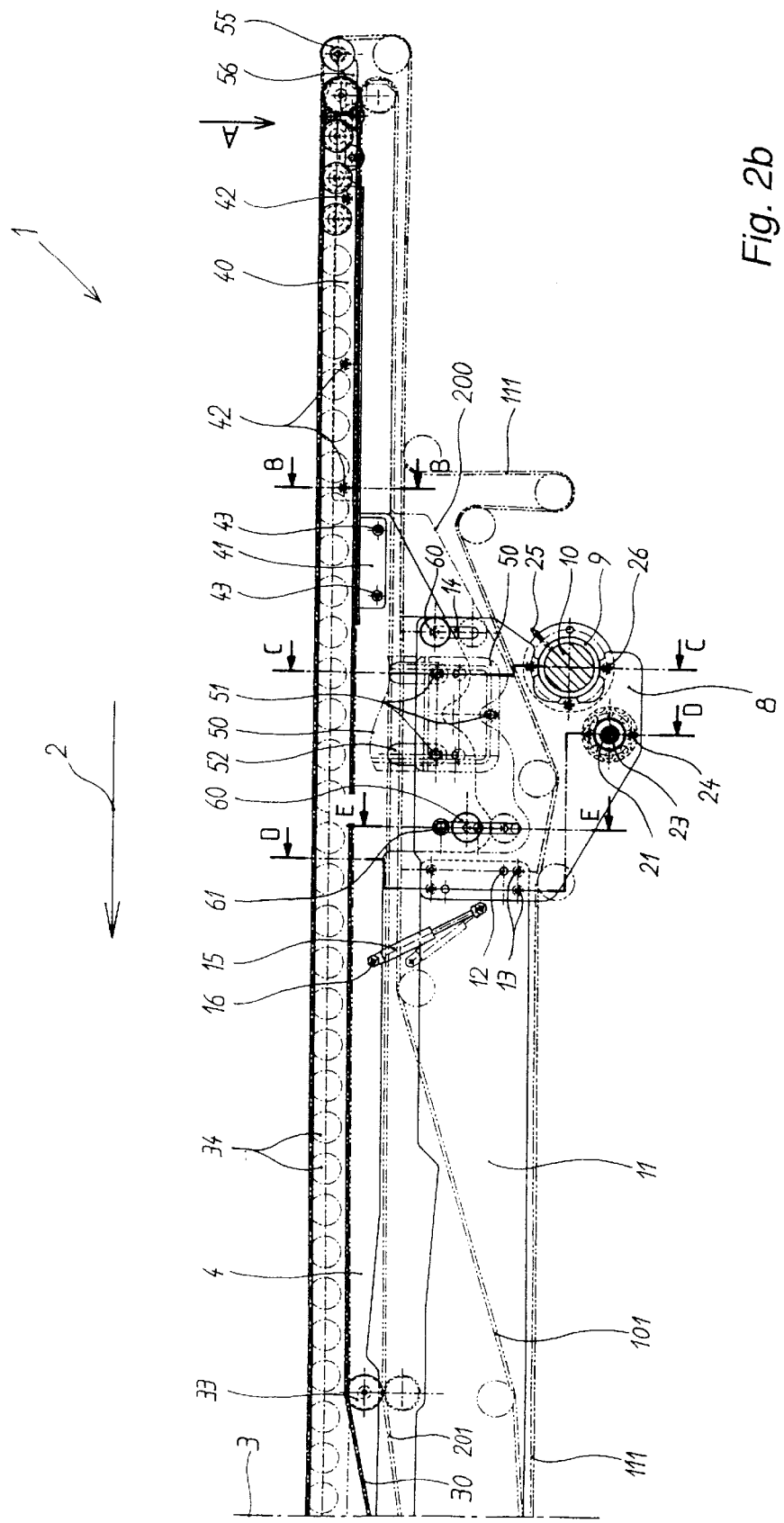
Figure 3:
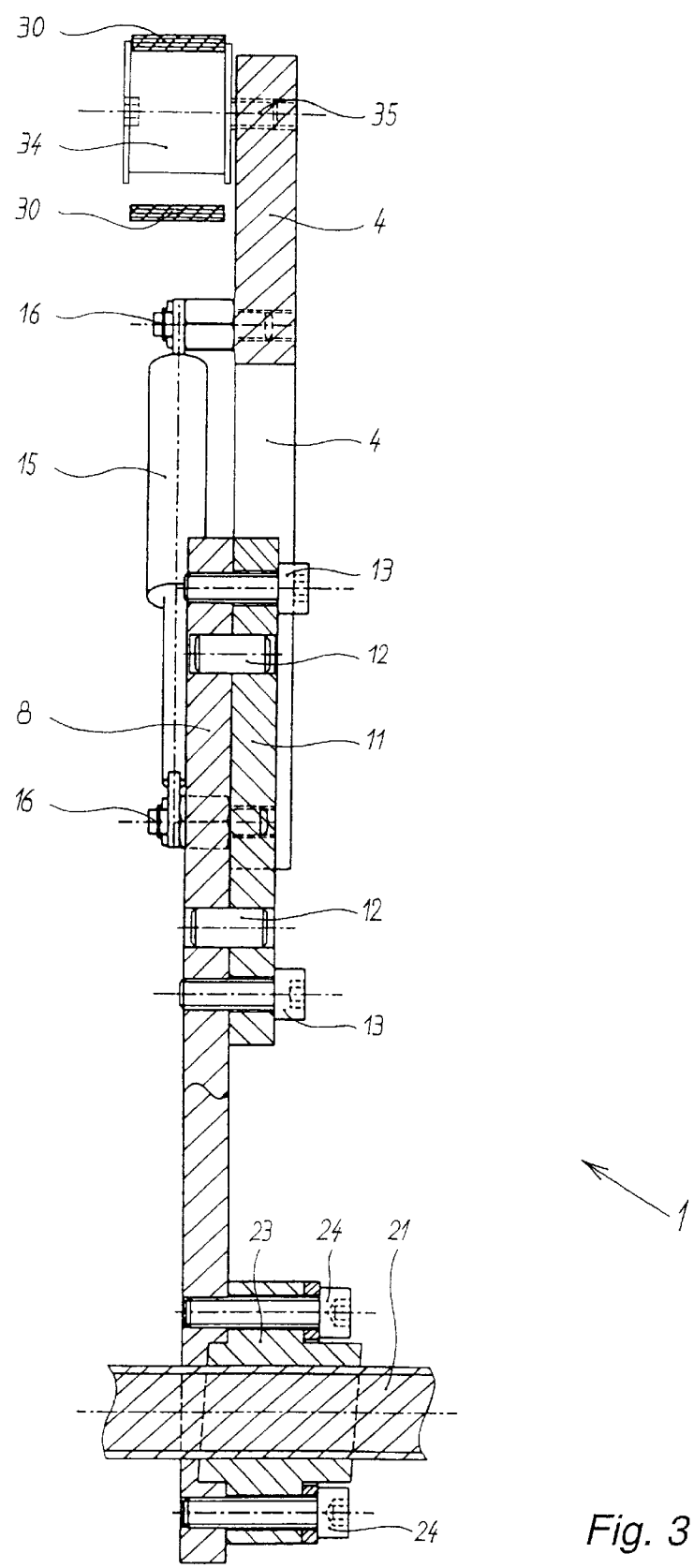
Figure 5:
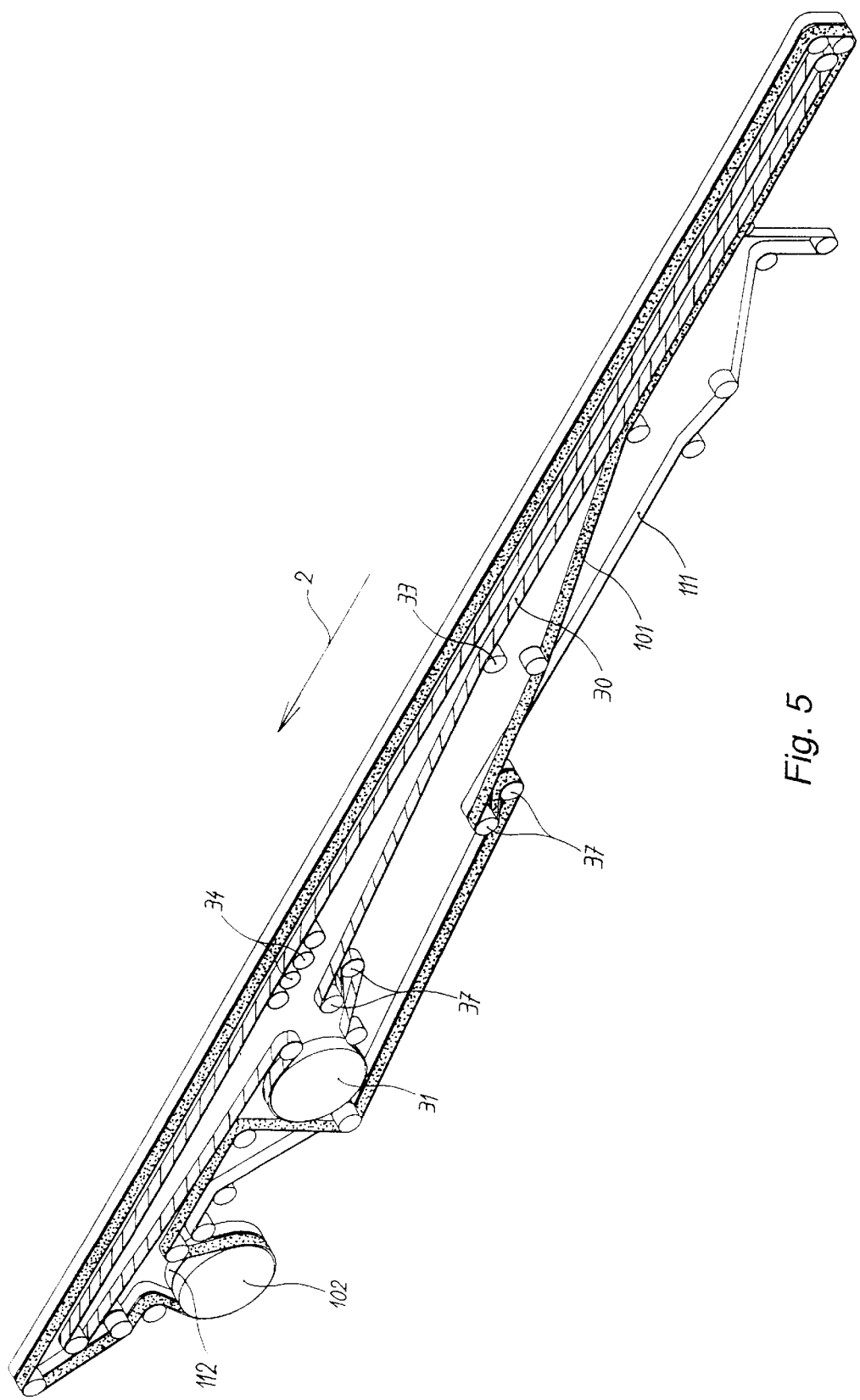
Figure 7:
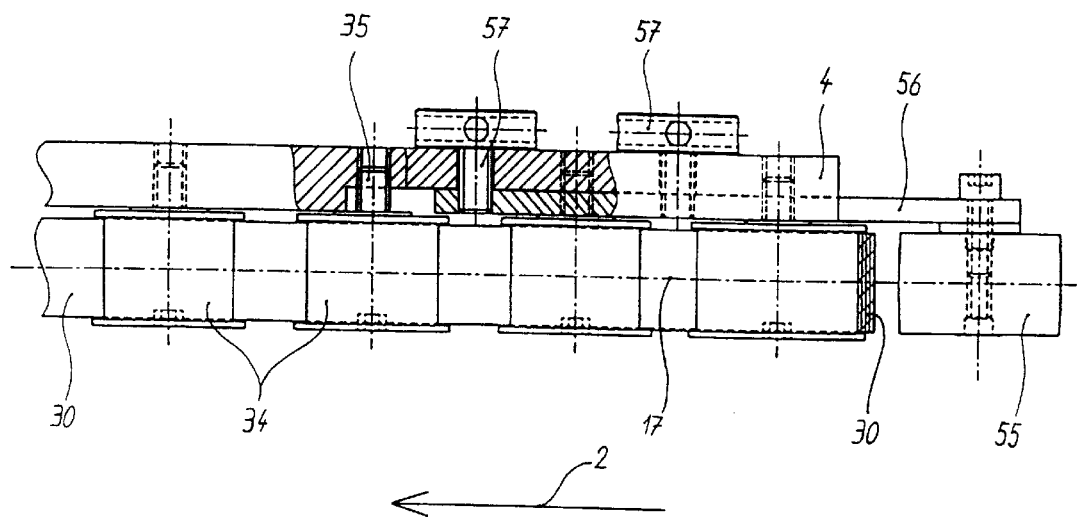
Figure 6:
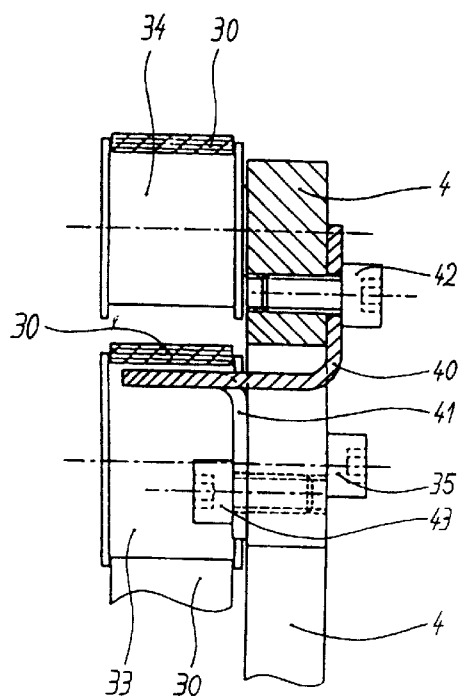
Figure 8:
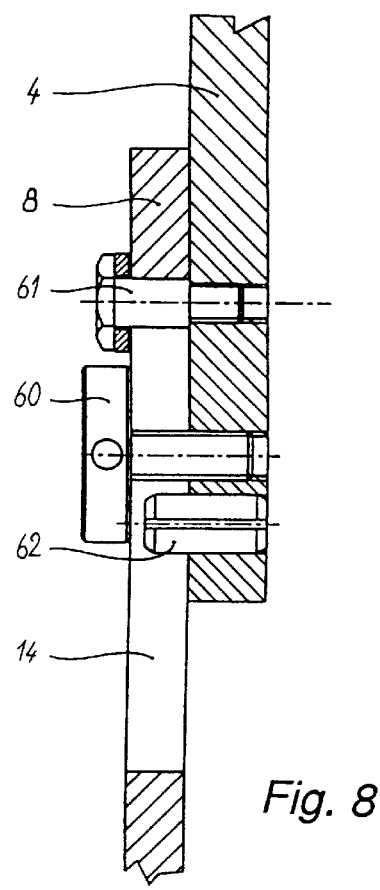

The invention will be more clearly understood from an embodiment given by way of non-limitative example and illustrated by the accompanying drawings, in which FIGS. 1a and 1b show the four main component parts of the structure of the conveyor, simultaneously in a working position and in the retracted position, FIGS. 2a and 2b are side views of the retractable central conveyor, respectively illustrating the parts arranged downstream and upstream from the gravity axis of this conveyor, FIG. 3 is a sectional view of FIG. 2b according to the line D—D, FIGS. 4a and 4b are sectional views according to the line C—C of FIG. 2b, respectively illustrating only the central conveyor in a working position and the same conveyor in a retracted position between the two lateral conveyors occupying a minimum width, FIG. 5 is a perspective view of the retraction of the central conveyor belt between the two lateral conveyor belts occupying a minimum width, FIGS. 6 and 8 are sectional views of FIG. 2b, respectively according to the lines B—B, E—E, FIG. 7 is a top view of the upstream end of the retractable central conveyor.

FIGS. 1a and 1b illustrate the assembly of the main component parts of the structure of the retractable central conveyor 1. According to the arrow 2, showing the travelling direction of the workpieces in the folder-gluer, FIG. 1a shows the part downstream from the gravity axis 3 of the conveyor and FIG. 1b shows the part upstream from this same gravity axis. An upper longitudinal bar 4, which is one of the four main component parts of this structure, is simultaneously shown in continuous line in a working position and chain-dotted in a retracted position 200, thus illustrating the movement from one position to another at best. This upper longitudinal bar is supported, on the one hand, downstream by a stirrup 5 which transversely slides through a smooth bearing 6 (FIG. 2a) on an axis 7 connecting the two lateral frames (not shown) of the folder-gluer and, on the other hand, upstream by another stirrup 8 which simultaneously slides through a smooth bearing 9 (FIG. 2b) on an axis 10 being identical with the axis 7. The two stirrups 5 and 8 are connected by a lower longitudinal bar 11 through centering pins 12 and locking screws 13 (FIG. 3). The upper longitudinal bar 4 can be lowered in a slanted vertical movement through two pairs of vertical grooves 14 machined in the surfaces of the stirrups 5 and 8 (FIGS. 1a and 1b).

The upper longitudinal bar 4 is manually moved due to its ergonomic profile and the movemement of this bulky part is simplified by the help of two damping means 15, each comprising a cylinder and a pneumatic piston. One end of these damping means is fixedly attached to the upper longitudinal bar 4, whereas the other end is linked to the vicinity of one end of the lower longitudinal bar 11. Axes 16, which are screwed in the upper and lower longitudinal bars, constitute the fastening means of the freely rotatable damping means. Thus, only the upper longitudinal bar 4 can vertically move in order to change from a working position into the chain-dotted retracted position 200 (FIGS. 1a, 1b).

FIGS. 2a and 2b are side views of the downstream and upstream halfs of the conveyor 1 showing the retracted position 200 of the upper longitudinal bar 4. On these figures are also represented, on the one hand, chain-dotted, the sinuous run 201 of the belt 30 of the central conveyor 1 being in its retracted position and, on the other hand, the two belts 101 and 111 respectively of the lateral conveyor 100 on the operator's side and of the lateral conveyor 110 opposite the operator's side (FIG. 4b) with regard to the central axis 17 of the central conveyor 30 (FIG. 7).

The lateral positioning of the conveyor 1 between the frames of the folder-gluer is actuated by two shifting spindles 20 and 21, which are supported at their ends between the two frames of the folder-gluer. These shifting spindles extend through two nuts 22 and 23 respectively, which are held by screws 24 to the stirrup 5 and the stirrup 8 respectively (FIG. 3). Sliding on the axes 7 and 10, the whole conveyor 1 is carried by the smooth bearings 6 and 9 which are lubricated by lubricators 25 and fixedly attached to the respective stirrups 5 and 8 by screws 26 (FIG. 4a).

FIG. 5 is a perspective view of the conveying path of the three belts of the conveyors 1, 100, 110 and shows the position taken by each of these belts when the central conveyor 1 is in a retracted position, incorporated in the two lateral conveyors 100 and 110. The belts 101 and 111 of the lateral conveyors are driven through two pulleys 102 and 112 respectively. These two coaxial drives are dependent on each other whereas the belt 30 of the retractable central conveyor 1 is driven by a driving pulley 31 mounted on an independent hexagonal shaft 32 (FIG. 2a). The run of the belt 30 passes around a plurality of return roller 33 and support rollers 34, each being fixedly attached to the upper 4 or lower 11 longitudinal bar through a screw 35 crossing their ball bearings 36 (FIG. 4a). Pairs of tightening rollers 37 are introduced in the sinuous run of each belt and compensate possible variations in their lengths. The belt tension is manually adjusted by the rotation of a setting screw 38, housed in an opening 39 machined in the side of the corresponding conveyor (2a). The two tightening rollers 37 are moved in an opposite direction by the rotation of the setting screw 38, which fact allows to individually tighten or slacken each belt.

As better shown in FIG. 6, which is a vertical section of the upstream part of the conveyor 1 illustrated in FIG. 2b, plates 40 and 41, which are bent at right angle, are fixed by a plurality of screws 42 and 43 respectively against the surface C.O.C. or C.C of the upper longitudinal bar 4. These plates are provided to support the belt 30 and to avoid its possible flection liable to inversely affect the retracting of the central conveyor 1.

During converting in a folder-gluer, the central conveyor is generally equipped with an upper belt conveyor simplifying the conveying of the blanks seized between the belts of the lower and upper conveyors. To this end, the conveyor 1 of the present invention may be equipped with an upwardly bent support 50, able to support any conventional upper conveyor. FIGS. 2b and 4a show the end of the support 50 being perpendicularly fixed by three screws 51 against the surface on the operator's side of the stirrup 8. Two grooves 52 are vertically machined in the upper longitudinal bar 4 to avoid interferring with its vertical movement and to allow its unhindered moving around the two upper screws 51.

FIG. 4b is a sectional view of the position of the central conveyor 1 being retracted between the two conventional lateral conveyors 100 and 110. Each lateral conveyor 100, 110 comprises a longitudinal bar 103, respectively 113, an opening 104, respectively 114, for the passage of the support 50, and a smooth bearing 105, respectively 115, held against the longitudinal bar of the corresponding conveyor by screws 106, respectively 116.

As shown in detail in FIG. 7, a roller 55 aligned on the axis 17 is arranged at each end of the upper longitudinal bar 4. This roller 55 is mounted on a removable extension 56 held by two knurled screws 57 against the indented surface of the upper longitudinal bar 4 on the operator's side.

The retraction of the conveyor of the present invention achieves, firstly, by removing the two extensions 56 equipped with the rollers 55. Then, the upper longitudinal bar 4 has to be set free by unscrewing two pairs of knurled screws 60 (FIG. 8), which hold it clamped against the stirrups 5 and 8. Owing to the damping means 15, the upper longitudinal bar keeps its balance without presenting any risk possibly resulting from the unscrewing of the knurled screws 60. Afterwards, the upper longitudinal bar can be lowered on one side then on the other by exerting a vertical pressure on its upper edge. This vertical movement is guided by axles 61 and pins 62, which are screwed respectively driven in the upper longitudinal bar 4 and slide without play in the two paires of grooves 14 (FIG. 2a). The upper longitudinal bar 4 having been lowered, the knurled screws 60 can be clamped again and the whole retractable conveyor 1 can be laterally moved along the transversal axes 7 and 10 owing to the shifting spindles 20 and 21. Thus, the central conveyor can be retracted without the necessity of removing and slackening the belt 30. In fact, the vertical movements of the upper longitudinal bar only involve a minimum variation of the length of the drive belt 30 with respect to its entire length. Therefore, it is sufficient to take advantage of the elasticity characteristics of the belt to enable this movement without involving unacceptable stress and without the need of any other handlings.

Numerous improvements can be applied to this conveyor in the scope of the claims.

What is claimed is:

1. A folder-gluer for converting plate-like workpieces, the folder-gluer comprising:

two lateral conveyors;

a central conveyor positioned between the two lateral conveyors and transversely moveable with respect to a traveling direction of the plate-like workpieces, the central conveyor comprising:

a central conveyor belt supported between the two lateral conveyors as to be raised between the two lateral conveyors and lowered from between the two lateral conveyors; and a driving member that drives the belt, the two lateral conveyors being moveable into a side by side arrangement when the central conveyor belt is lowered from between the two lateral conveyors such that a useable conveying width of the folder-gluer is reduced.

2. A folder-gluer according to claim 1, further comprising two frames and the two lateral conveyors arranged between the two frames.

3. A folder-gluer according to claim 2, wherein the central conveyor is also transversely moveable between the two frames of the folder-gluer.

4. A folder-gluer according to claim 1, further comprising:

a longitudinal bar supporting the central conveyor belt and the longitudinal bar being raisable to raise the central conveyor belt between the two lateral conveyors, the longitudinal bar being lowerable to lower the central conveyor belt from between the two lateral conveyors.

5. A folder-gluer according to claim 4, further comprising at least one damping member which assists in the raising and lowering of the longitudinal bar.

6. A folder-gluer according to claim 4, wherein the longitudinal bar is adapted to be manually lowered and raised.

7. A folder-gluer according to claim 6, wherein the longitudinal bar is so supported and movable as to be manually lowered and raised in a vertical slanted movement.

8. A folder-gluer according to claim 4, wherein the longitudinal bar comprises:

an upper longitudinal bar configured to be raised and lowered between the two lateral conveyors;

a lower longitudinal bar;

two stirrups connecting the upper longitudinal bar to the lower longitudinal bar, each stirrup having two pairs of vertical grooves, wherein the upper longitudinal bar is raised and lowered by guiding axes and pins which are positioned respectively within the two pairs of vertical grooves.

9. A folder-gluer according to claim 8, wherein the raising and lowering of the upper longitudinal bar is lockable by clamping at least one screw through the vertical grooves and the upper longitudinal bar.

10. A folder-gluer according to claim 8, further comprising at least one damping member which assists in the raising and lowering of the upper longitudinal bar, the at least one damping member comprises a cylinder with a pneumatic piston therein, each damping member having ends which are fixedly attached to the upper longitudinal bar and the lower longitudinal bar respectively.

11. A folder-gluer according to claim 8, wherein the stirrups include:

nuts which are crossed by shifting spindles that enable manual or motorized transverse movement of the central conveyor; and bearings which support the central conveyor during the transverse movement, the bearings sliding on axes which are perpendicularly arranged between the two lateral conveyors of the folder-gluer.

12. A folder-gluer according to claim 8, wherein at least one of the two stirrups includes a support that supports an additional conveyor above the two lateral conveyors and the central conveyor.

13. A folder-gluer according to claim 4, wherein each of the two lateral conveyors includes a lateral conveying belt defining a run;

the folder-gluer further comprising a return roller attached to the longitudinal bar such that the driving member and the return roller direct the central conveyor belt to follow a run contained within the runs of the lateral conveyor belts when the longitudinal bar is lowered from between the two lateral conveyors.

14. A folder-gluer according to claim 4, wherein the central conveyor further comprises:

at least one bent plate attached to the longitudinal bar, the at least one bent plate supporting the central conveyor belt so as to allow the longitudinal bar to be lowered between the two lateral conveyors.

15. A folder-gluer according to claim 4, wherein the central conveyor further comprises:

a removable extension arranged at each end of the longitudinal bar; and a roller attached to each removable extension and aligned with the central conveyor belt.

16. A folder-gluer according to claim 15, wherein the removable extension is arranged within an indented surface of the longitudinal bar.

17. A folder-gluer according to claim 1, wherein the driving member remains operational to drive the central conveyor belt when the central conveyor belt is lowered from between the two lateral conveyors.

18. A folder-gluer according to claim 1, further comprising at least one damping member which assists in the raising and lowering of the central conveyor belt.

19. A folder-gluer according to claim 1, wherein the central conveyor belt is adapted to be manually lowered and raised.

20. A folder-gluer according to claim 1, wherein each of the two lateral conveyors includes a lateral conveying belt defining a run, and the central conveyor belt is included within the runs defined by the lateral conveying belts when the central conveyor belt is lowered from between the two lateral conveyors.

* * * * *